May 31, 1955   S. M. MARCUS ET AL   2,709,362
VEHICLE TESTING DEVICES
Filed April 27, 1953   2 Sheets-Sheet 2
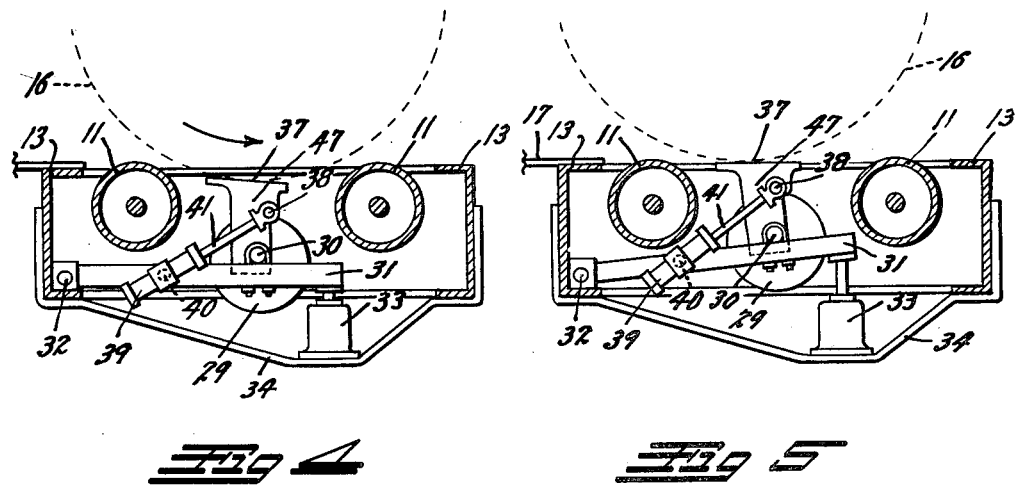
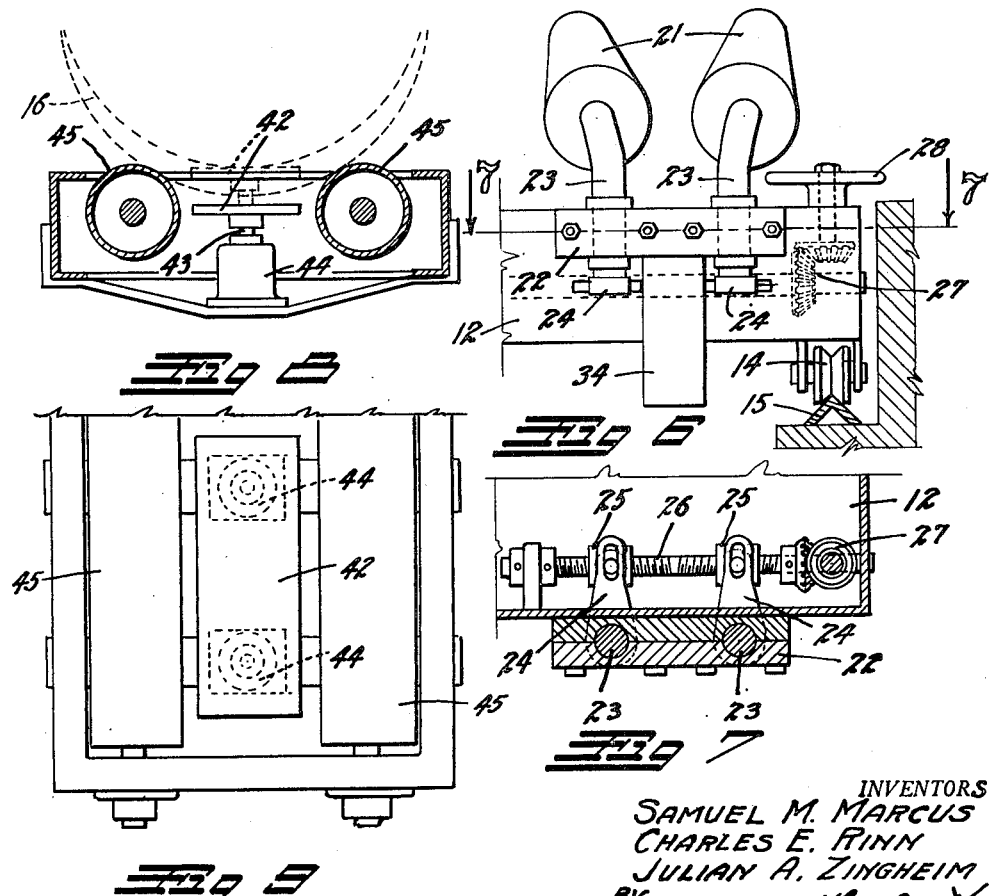
INVENTORS
SAMUEL M. MARCUS
CHARLES E. RINN
JULIAN A. ZINGHEIM
BY
ATTORNEY

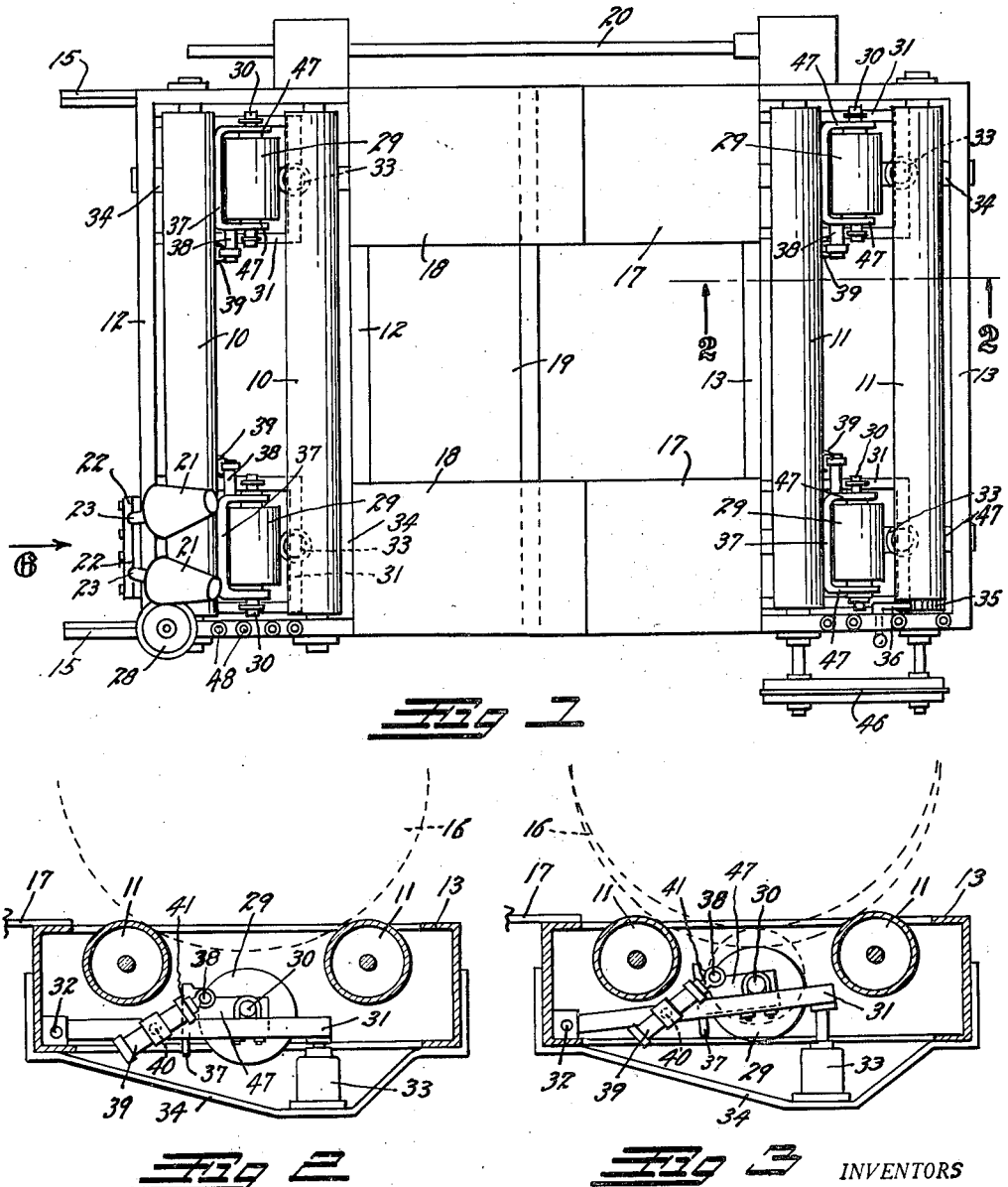

United States Patent Office 2,709,362
Patented May 31, 1955

2,709,362

VEHICLE TESTING DEVICES

Samuel M. Marcus, Charles E. Rinn, and Julian A. Zingheim, Denver, Colo., assignors to Marcus Motors, Inc., Denver, Colo., a corporation of Colorado Application April 27, 1953, Serial No. 351,310

11 Claims. (Cl. 73—72)

This invention relates to an automotive vehicle checking and testing device, and more particularly to a device of the character illustrated and described in applicant's co-pending application Serial No. 315,076.

The principal object of this invention is to provide a highly efficient device for subjecting an automotive vehicle to various vibrations to simulate road conditions in order to locate defects in the running gear of the vehicle.

It has been found that it is exceedingly difficult to drive a vehicle from the wheel-supporting rollers of vehicle-testing devices, such as dynamometers, due to the fact the rollers become smooth and sufficient traction cannot be obtained to lift the wheels from the depression between the rollers.

Another object of the invention is to provide means in a vehicle-testing and checking device of this type for assisting the vehicle to drive from wheel-supporting rollers under its own power.

A further object is to provide efficient means for aligning the vehicle with the rollers of the testing device and maintaining this alignment while the wheels are in motion.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a plan view of the improved vehicle checking and testing device;

Figs. 2, 3, 4, and 5 are enlarged cross-sections, taken on the line 2—2, Fig. 1, showing various operative positions to be later described;

Fig. 6 is an enlarged, fragmentary view, looking in the direction of the arrow 6 in Fig. 1;

Fig. 7 is a horizontal section, taken on the line 7—7, Fig. 6;

Fig. 8 is a cross-section through an alternate form of the invention; and

Fig. 9 is a fragmentary plan view of the alternate form of Fig. 8.

In the drawing, the usual hydraulic and air hoses and piping have been eliminated for the sake of clearness of illustration.

The improved vehicle checking and testing device employs a front set of spaced-apart wheel-supporting rollers 10 and a rear set of similarly spaced rollers 11. The front rollers 10 are rotatably mounted in a front rectangular supporting frame 12, and the rear rollers 11 are mounted in a similar rear supporting frame 13. The rear frame 13 is fixedly mounted in a floor, and the front frame 12 is mounted on supporting wheels 14 arranged to travel on suitable tracks 15 so that the spacing of the two frames can be changed to accommodate vehicles of different wheel bases.

The frames 12 and 13 are installed over an inspection pit 16 and wheel-supporting plates 17 are secured to the rear frame 13 and extend forwardly to rest on a cross beam 19 extending transversally across the pit 16. Similar wheel-supporting plates 18 extend rearwardly from the front frame 12 and rest upon the plates 17 in slidable engagement therewith.

The rear rollers 11 are driven from frictional engagement with the vehicle tires. The front rollers 10 are driven from the rear rollers 11 through the medium of a counter-shaft 20 which transmits power between the pairs of rollers through the medium of bevel gears, or in any other desired manner.

Thus, it can be seen that if the wheels of a vehicle are in place on the rollers 10 and 11, operation of the vehicle will rotate all of the rollers in both sets simultaneously.

Lateral movement of the vehicle on the rollers is prevented by means of two conical rollers 21 positioned on an incline at each side of one of the front wheels of the vehicle. Each of the rollers 21 is mounted on the upper bent extremity of a vertical roller shaft 23. The shafts 23 are rotatably mounted in vertical bearings 22 on the front frame 12.

A lever 24 is fixed on each shaft 23 and extends rearwardly into the frame 12 into engagement with a threaded nut 25 mounted on a threaded shaft 26. The shaft 26 is oppositely threaded so that one of the nuts 25 will have a left-hand thread, while the other has a right-hand thread. The shaft 26 is rotated through the medium of bevel gears 27 from a hand wheel 28 on the frame 12. Therefore, rotation of the hand wheel 28 in opposite directions acts to cause the nuts 25 to move in opposite directions so as to swing the two conical rollers 21 toward or away from each other to adjust them to accommodate vehicle tires of various sizes.

A bouncing action can be imparted to any one or all of the four wheels of the vehicle by means of eccentric rollers 29, there being one of the rollers 29 below each wheel position on the device. Each of the rollers 29 is mounted on a roller shaft 30 carried in a roller frame 31. The roller frames are hinged to their respective frames 12 and 13 upon suitable hinge pins 32. The roller frames 31 can be swung about their hinged axes by means of hydraulic jacks 33 positioned beneath the free extremities of the frames and supported upon suitable supporting straps 34.

It can be seen that if fluid is introduced into any of the jacks 33, it will cause that jack to lift its respective roller frame 31 until the eccentric roller 29 thereon contacts the vehicle tire to impart a vertical vibration thereto. Thus, a simulated road condition can be applied to any of the tires, and the chassis and running gear can be inspected from the pit 16 while the wheels are rotating to locate and correct any defects.

After the checking has been completed, it is necessary to back the vehicle from the device. As the vehicle moves rearwardly, the front frame 12 will move rearwardly until it strikes the cross beam 19 or other stop device, at which time the front wheels will roll from between the front rollers 10 and from the device. To assist in backing the vehicle, the rearmost rear roller 11 is provided with a ratchet gear 35 with which a ratchet pawl 36 may be engaged to prevent forward rotation of the rear roller under the rearward traction of the rear wheels.

It has been found, however, that even with the ratchet pawl 36 engaged, it is difficult for the rear wheels to obtain sufficient traction on the rear roller to lift the weight of the vehicle from between the rollers. To overcome this objection, each of the roller frames carries a hinged foot plate 37. The foot plates 37 are U-shaped so that their extremities extend around the extremities of the rollers 29 to rotatably engage the roller shafts 30.

Normally, the foot plates 37 lie alongside the rollers 29 supported by crank pins 38, one of which extends from each of the foot plates 37. The foot plates can be elevated to a position to engage the vehicle tire in any desired manner. As illustrated, they are elevated by plungers 41 actuated from pneumatic cylinders 39. One of the pneumatic cylinders is pivotally mounted, as indicated at 40, on the side of each of the roller frames 31, with its plunger 41 connected with the adjacent crank pin 38.

Thus, it can be seen that if compressed air is admitted to the cylinders 39, the plungers will be projected to swing the foot plates over the eccentric rollers 29 and beneath the vehicle tires.

In Fig. 2 of the drawing the wheel of a vehicle is indicated in broken line in position between the pair of rear rollers 11. In Fig. 3 the hydraulic jack 33 has been actuated to lift the eccentric roller 29 against the tire of the vehicle for vibration purposes. Upon completion of the vibration test, the jack 33 is lowered and air is admitted to the cylinder 39 to swing the foot plate 37 beneath the vehicle wheel, as indicated in Fig. 4. This will elevate the wheel to a position where it will receive traction and be enabled to travel over the rearmost roller 11 without effort.

If it is desired to still further facilitate the driving of the vehicle from the device, the hydraulic jacks 33 may be actuated to lift the roller frames 31 and the foot plates 37 to the position of Fig. 5 so that the vehicle may be easily rolled from the device without power, if desired.

It is desired to call attention to the fact that if the wheels of the vehicle are rotating rearwardly, as indicated by the arrow in Fig. 4, it is only necessary to lift the foot plates until they contact the vehicle tire. The reaction of the rotating wheels will then swing the foot plates forwardly beneath the tires and elevate the wheels to the "roll-off" position under the power of the vehicle, without additional effort. The maximum extension of the plungers 41 is such that the plungers will act as a stop means for stopping the forward swing of the foot plates at the position of maximum elevation. The air cylinders 39 may be omitted, and the foot plates may be manually lifted into contact with the rotating tires, if desired, suitable stop means being provided for limiting the forward swing of the foot plates.

For use on devices such as dynamometers, which do not have the bouncing action or eccentric rollers, the hinged roller frames 31 may be eliminated, in which event a foot plate, as illustrated at 42 in Fig. 8, may be used. In this case the foot plate 42 is mounted directly on the plunger 43 of a hydraulic jack or air cylinder 44.

The action is the same as previously described, that is, when it is desired to remove the vehicle from the testing device, the plungers 43 are actuated to lift the foot plate 42 to elevate the vehicle wheels to a level flush with or above the wheel-supporting rollers so that the vehicle can be easily rolled therefrom.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. In a vehicle-testing device of the type having spaced-apart rollers for receiving the wheels of a vehicle, means for raising the wheels from between said rollers comprising: a foot plate normally positioned below the tops of said rollers and between the latter; a pressure-operated device connected with said foot plate and acting to elevate the latter when desired; a hinged frame positioned below and supporting said foot plate and said pressure-operated device; and means connected with said frame and acting to swing said frame about its hinge axis.

2. An automotive vehicle-testing device comprising: a pair of rotatable rollers spaced apart to receive the wheel of a vehicle therebetween; a supporting frame supporting said rollers; a hinged frame hinged to said supporting frame and extending beneath said rollers; a roller shaft supported by said hinged frame; an eccentric roller rotatably mounted on said roller shaft and positioned between said rollers; and means acting to swing said roller frame upwardly to bring said eccentric roller into contact with the tire of said wheel, a foot plate extending along one side of said eccentric roller, the extremities of said foot plate being rotatably mounted on said roller shaft; and means acting to swing said foot plate from the alongside-position to a position between the eccentric roller and the vehicle wheel.

3. An automotive vehicle-testing device as described in claim 2 having a hydraulic jack positioned beneath and in contact with said roller frame and adapted to elevate the latter; and a pressure-actuated device mounted on said roller frame and operatively connected to said foot plate and acting to swing the latter about the axis of said eccentric roller.

4. An automotive vehicle-testing device comprising: a roller frame; a pair of spaced-apart, parallel rollers carried by said roller frame and adapted to support the wheel of a vehicle; a pair of spaced-apart shafts extending upwardly forwardly of said roller frame and thence inclining rearwardly to a position at each side of said wheel; and guide rollers rotatably mounted on the rearwardly inclining portions of said shafts and adapted to engage the sides of said wheel to retain the latter on said rollers.

5. An automotive vehicle-testing device as described in claim 4 in which the guide rollers have a conical shape, with the smaller diameters directed toward the axis of the vehicle wheel.

6. An automotive vehicle-testing device as described in claim 5; and means for oppositely rotating said shafts so as to swing said conical rollers toward or away from the sides of said vehicle wheel.

7. A vehicle-testing device comprising: a pair of spaced-apart rollers adapted to receive the wheel of a vehicle therebetween; a hinge shaft positioned between and below the upper surfaces of said rollers; and a foot plate hingedly mounted on said hinge shaft and positioned between said rollers so as to swing from a lower position out of contact with said wheel to an elevated position in contact with said wheel to provide a traction surface for the latter.

8. A device for supporting and vibrating a wheel of an automotive vehicle comprising: a supporting frame; a pair of wheel-supporting rollers mounted in said frame in parallel, spaced-apart relation and adapted to rotatably support a vehicle wheel; a shaft positioned between said rollers; and a foot plate positioned between said rollers, said foot plate being hingedly mounted on said shaft so that it may swing upwardly from a lowered position between said rollers to an elevated position and into contact with said wheel to provide a traction surface for said wheel between said rollers when desired.

9. A device for supporting and vibrating a wheel as described in claim 8 having means for raising and lowering said shaft.

10. A device for supporting and vibrating a wheel as described in claim 9 having an eccentric roller mounted on said shaft so that it will raise therewith into contact with said tire, said foot plate being positioned to swing either over or alongside said eccentric roller.

11. A device for supporting and vibrating a wheel as described in claim 8 having means for stopping the swing of said foot plate at the position of maximum elevation.

References Cited in the file of this patent

UNITED STATES PATENTS

| | | |
|---|---|---|
| 991,381 | Simmers | May 2, 1911 |
| 2,076,759 | Atti et al. | Apr. 13, 1937 |
| 2,583,201 | Bennett | Jan. 22, 1952 |
| 2,601,187 | Volis | June 17, 1952 |